(12) United States Patent
Fowler et al.

(10) Patent No.: US 8,102,389 B2
(45) Date of Patent: Jan. 24, 2012

(54) BOX CASTING USING AN INTEGRATED ACCELERATION DATA STRUCTURE

(75) Inventors: David Keith Fowler, Hastings, MN (US); Eric Michael Radzikowski, Franklin, WI (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 11/674,692

(22) Filed: Feb. 14, 2007

(65) Prior Publication Data
US 2008/0192046 A1 Aug. 14, 2008

(51) Int. Cl.
*G06T 15/00* (2011.01)

(52) U.S. Cl. ........................................ 345/419

(58) Field of Classification Search .................. None
See application file for complete search history.

(56) References Cited

U.S. PATENT DOCUMENTS

| | | | |
|---|---|---|---|
| 5,548,694 A * | 8/1996 | Frisken Gibson | 345/424 |
| 5,572,634 A * | 11/1996 | Duluk, Jr. | 345/419 |
| 5,812,138 A * | 9/1998 | Devic | 345/422 |
| 6,708,142 B1 * | 3/2004 | Baillot et al. | 703/2 |
| 6,748,307 B1 * | 6/2004 | Sala et al. | 701/46 |
| 6,809,738 B2 * | 10/2004 | Hubrecht et al. | 345/543 |
| 2004/0091084 A1 * | 5/2004 | Griffith | 378/210 |
| 2004/0102902 A1 * | 5/2004 | Hill | 702/14 |
| 2006/0258445 A1 * | 11/2006 | Nishimori et al. | 463/30 |
| 2007/0182732 A1 * | 8/2007 | Woop et al. | 345/420 |
| 2007/0198581 A1 * | 8/2007 | Nonclercq et al. | 707/103 R |

OTHER PUBLICATIONS

Ming, L., Stefan, G., Collision detection between geometric models: A survey, Aug. 1998, Proc. of IMA Conference on Mathematics of Surfaces, pp. 1-20.*

* cited by examiner

*Primary Examiner* — Said Broome
(74) *Attorney, Agent, or Firm* — Patterson & Sheridan LLP

(57) ABSTRACT

Embodiments of the invention provide methods and apparatus to reduce the number of intersection tests required to determine if an object moving within a three-dimensional scene collides with any other objects. According to one embodiment of the invention, a physics engine may cast a velocity box into the scene and traverse the velocity box through an integrated acceleration data structure. By traversing the velocity box through an integrated acceleration data structure, a physics engine may determine which objects are in the same area of the scene and are likely intersect the velocity box. The physics engine may use the objects when performing intersection tests to reduce the number of intersection tests which are necessary to determine which objects intersect the velocity box. A reduction in the number of intersection tests may reduce the amount of time necessary to determine if a moving object collides with any other objects.

20 Claims, 17 Drawing Sheets

FIG. 8 (FRAME N)

FIG. 9 (FRAME N)

FIG. 10 (FRAME N+1)

FIG. 11 (FRAME N+1)

BOX CASTING USING AN INTEGRATED ACCELERATION DATA STRUCTURE

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

Image processing systems (such as ray-tracing image processing systems) may be used in combination with a physics engine (e.g., in a game system) to provide animation in a three-dimensional scene. The physics engine may simulate real world physical phenomena as applied to objects within the three-dimensional scene. For example, the physics engine may perform position updates for a moving object, and may perform collision detection tests to determine if the object collides with any other objects within the three-dimensional scene.

One major drawback of game system using ray tracing image processing is the large number of calculations, and thus processing power, required to simulate the physics involved with a three-dimensional scene and to perform ray tracing to render the scene. This leads to problems when fast rendering is needed. For example, fast rendering may be necessary when a physics engine and an image processing system are to render graphics for animation in a game console. Due to the increased computational requirements for performing the physics calculations and to perform ray tracing it is difficult to render animation quickly enough to seem realistic (realistic animation is approximately twenty to twenty-four frames per second).

Therefore, there exists a need for more efficient techniques and devices to perform ray tracing and to perform physics simulation.

SUMMARY OF THE INVENTION

Embodiments of the present invention generally provide methods and apparatus for physics simulation and image processing.

According to one embodiment of the invention, a method of performing collision detection in physics simulation is provided. The method generally comprising: generating a velocity box for a moving object within a three-dimensional scene, wherein the velocity box encompasses a path traversed by the moving object over a period of time; casting the velocity box into the three-dimensional scene to determine a set of objects in a same area as the velocity box; and based on the set of objects in the same area of the velocity box, determining objects which collide with the moving object.

According to another embodiment of the invention, a computer readable medium containing a program which, when executed, performs operations is provided. The operations generally comprising: generating a velocity box for a moving object within a three-dimensional scene, wherein the velocity box encompasses a path traversed by the moving object over a period of time; casting the velocity box into the three-dimensional scene to determine a set of objects in a same area as the velocity box; and based on the set of objects in the same area of the velocity box, determining objects which collide with the moving object.

According to another embodiment of the invention, a system is provided. The system generally comprising: A system comprising: a memory device; and a processing element configured to generate a velocity box for a moving object within a three-dimensional scene, wherein the velocity box encompasses a path traversed by the moving object over a period of time; cast the velocity box into the three-dimensional scene to determine a set of objects in a same area as the velocity box.

DETAILED DESCRIPTION OF THE PREFERRED EMBODIMENTS

Figure 1:
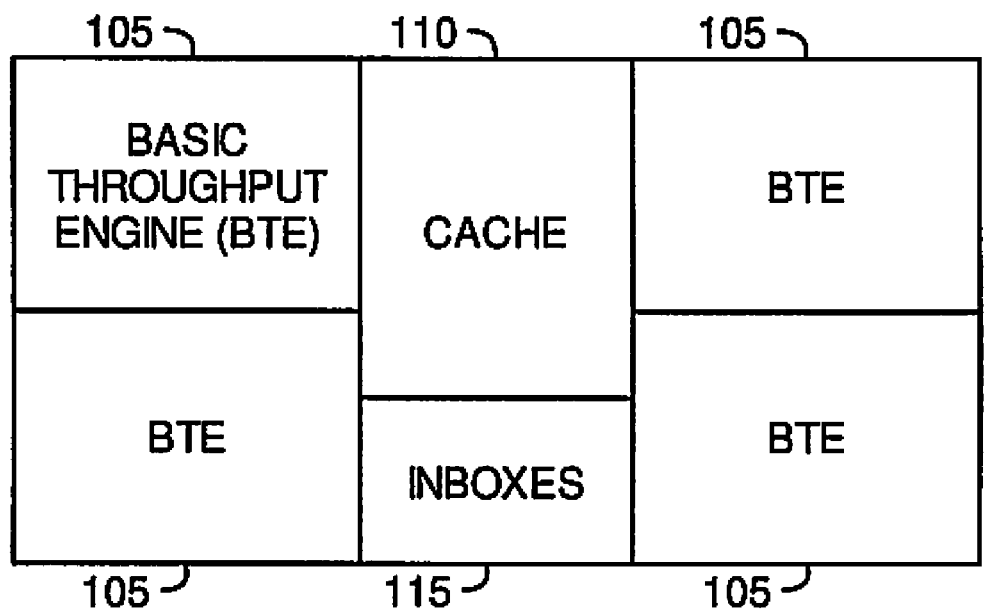
FIGS. 1 and 5 illustrate multiple core processing elements, according to embodiments of the invention.

Embodiments of the invention provide methods and apparatus to reduce the number of intersection tests required to determine if an object moving within a three-dimensional scene collides with any other objects within the same three-dimensional scene. According to embodiments of the invention, a physics engine may create a velocity box which surrounds the moving object as it moves from its initial position to its final position. Embodiments of the invention may cast the velocity box into the scene and traverse the velocity box through an integrated acceleration data structure which partitions the three-dimensional scene into bounding volumes. By casting a velocity box into the scene and traversing the velocity box through an integrated acceleration data structure, a physics engine may determine which objects are in the same area of the scene and are therefore likely intersect the velocity box. The physics engine may use the objects in the same area as the velocity box when performing intersection tests.

By only using objects which are in the same area as the velocity box during intersection tests, the physics engine may reduce the number of intersection tests which are necessary to determine which objects intersect the velocity box. A reduction in the number of intersection tests which may need to be performed by the physics engine may reduce the amount of time necessary to determine if a moving object collides with any other objects within the three-dimensional scene.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
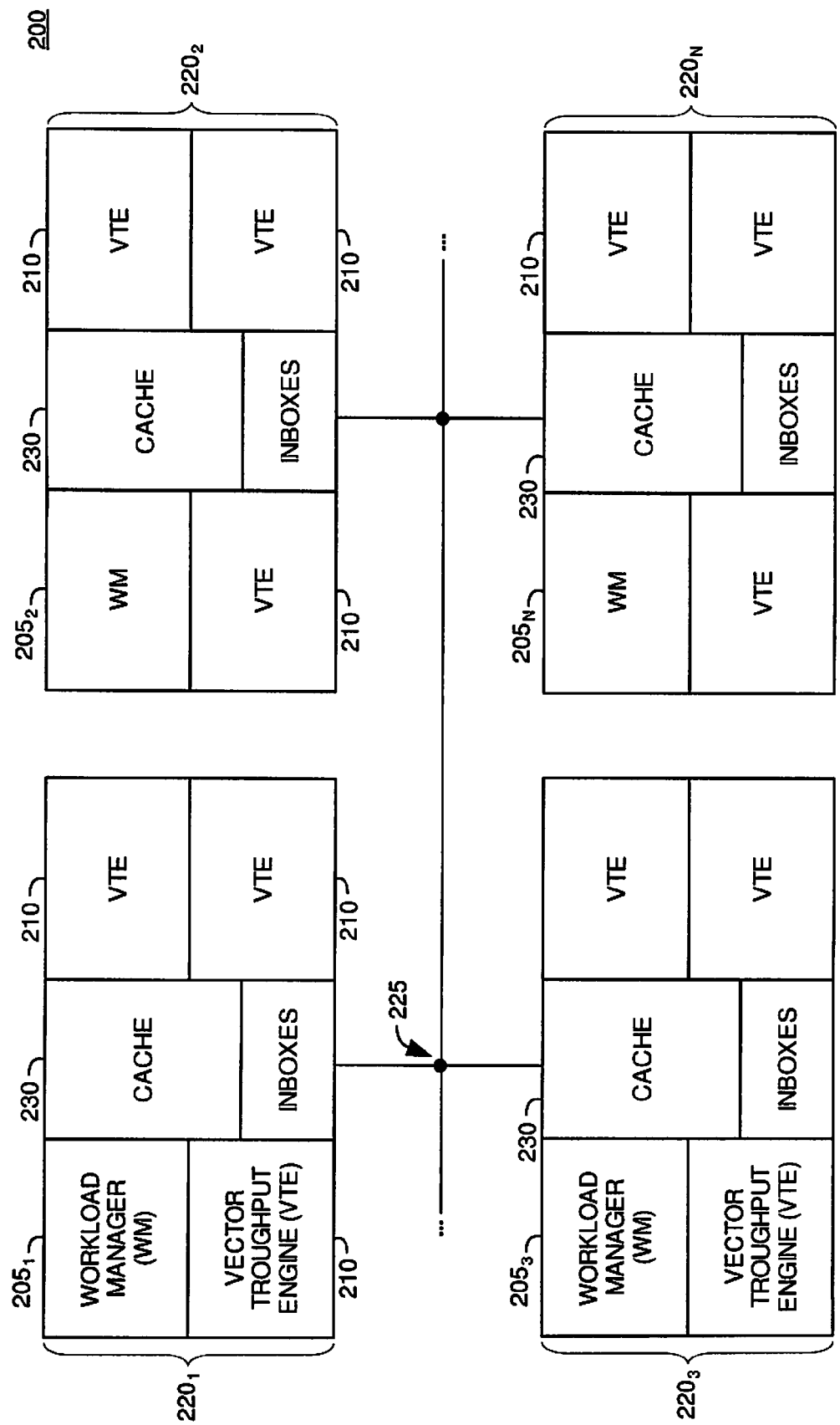
FIG. 2 illustrates multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$ according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three-Dimensional Scene

Figure 3:
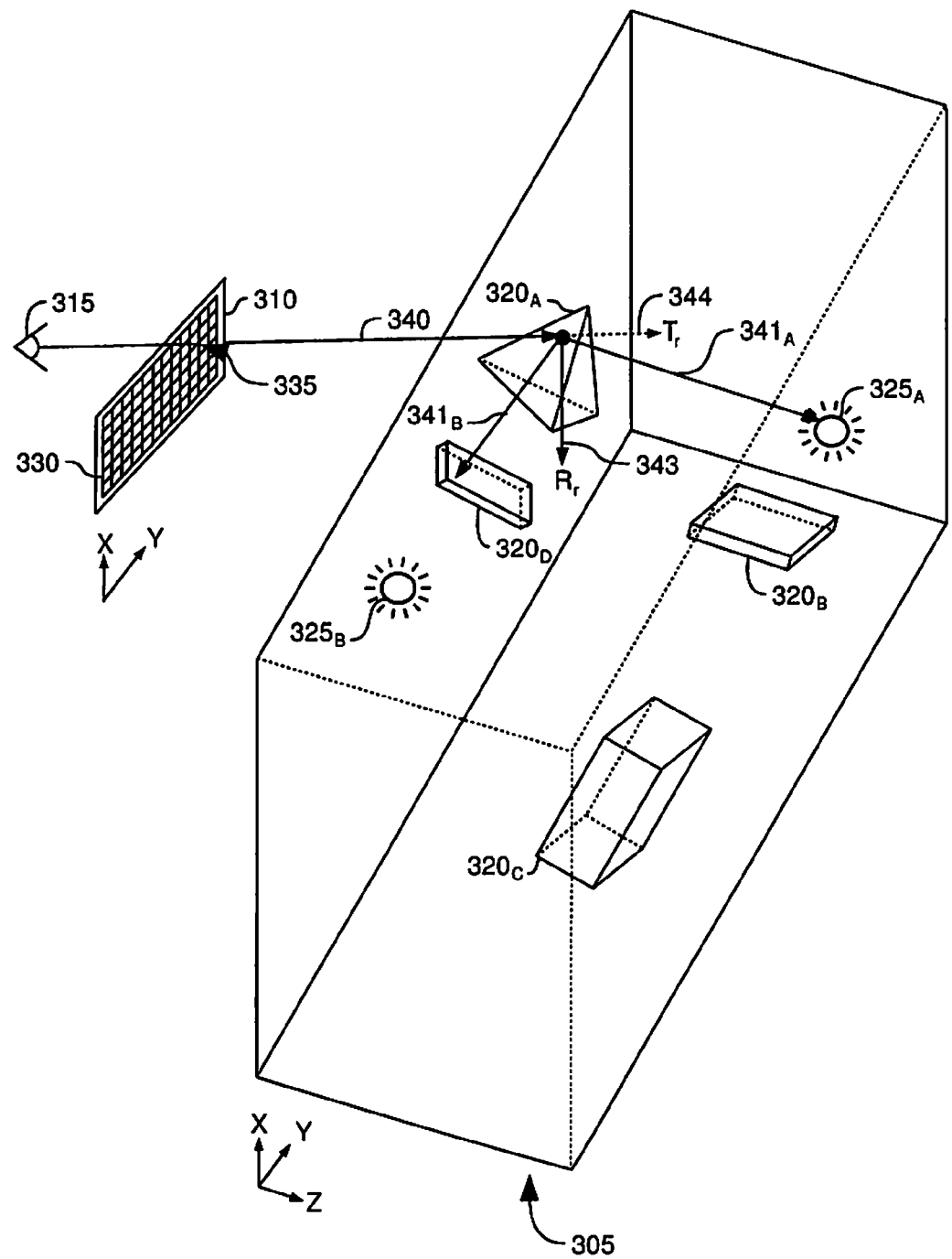
FIG. 3 is an exemplary three-dimensional scene to be rendered by an image processing system, according to one embodiment of the invention.

FIG. 3 is an exemplary three-dimensional scene 305 to be rendered by an image processing system. Within the three-dimensional scene 305 may be objects 320. The objects 320 in FIG. 3 are of different geometric shapes. Although only four objects 320 are illustrated in FIG. 3, the number of objects in a typical three-dimensional scene may be more or less. Commonly, three-dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three-dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 305 into a two-dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two-dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three-dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted or a refracted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted or refracted ray. A refracted ray may be issued by the image processing system if the object with which the original ray intersected has transparent or translucent properties (e.g., glass). A refracted ray traverses through the object at an angle relative to the angle at which the original ray struck the object. For example, refracted ray 344 is seen traversing through the object $320_A$ which the original ray 340 intersected.

Another type of secondary ray is a transmitted or a refracted ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
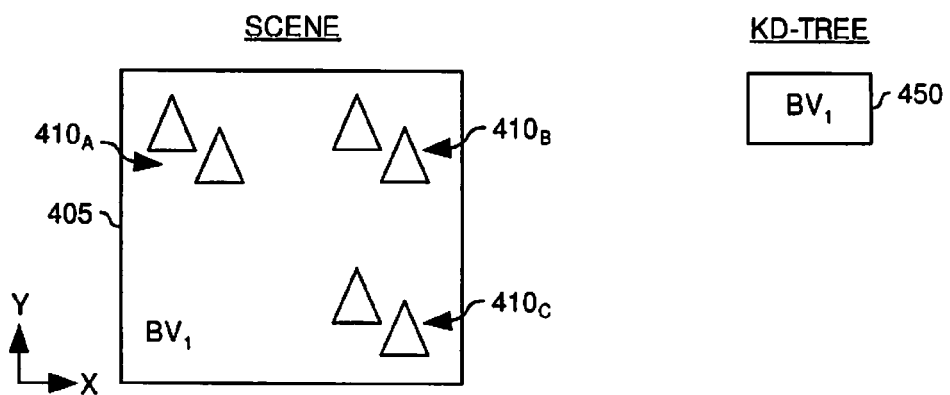
FIGS. 4A-4C illustrate a two-dimensional space to be rendered by an image processing system and a corresponding spatial index created by an image processing system, according to embodiments of the invention.
Figure 4B:
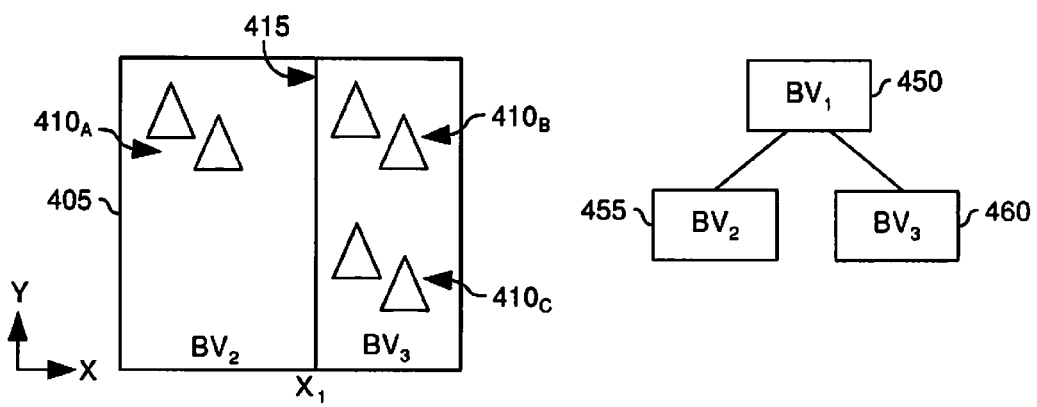
Figure 4C:
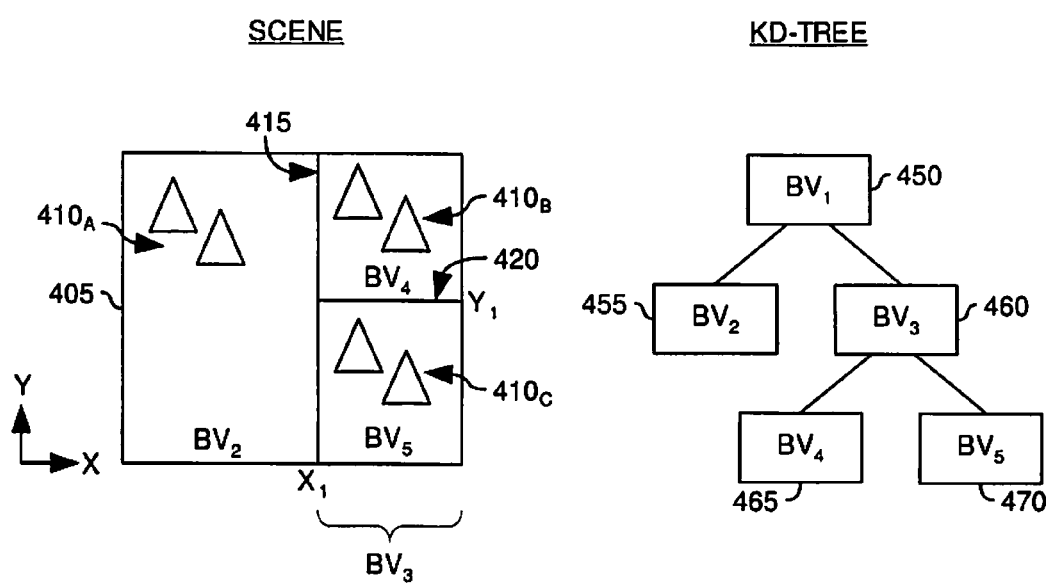

FIGS. 4A-4C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 4A-4C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 4A illustrates a two-dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two-dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two-dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Physics Engine

A physics engine is an application which may simulate real world physical phenomena as applied to objects within a three-dimensional scene. A physics engine may be used to simulate and predict the effects of physical phenomena on a frame to frame basis. For example, the physics engine may perform position updates for an object if the object is moving, and may perform collision detection tests to determine if an object collides with any other objects within the three-dimensional scene.

An image processing system may be used in conjunction with a physics engine to render the simulated physical interactions and objects within a three-dimensional scene to a two-dimensional screen. For example, a video game engine may use both a physics engine and an image processing system to simulate object movements or interactions within a three-dimensional scene and to display the objects and the environment on a monitor.

Figure 5:
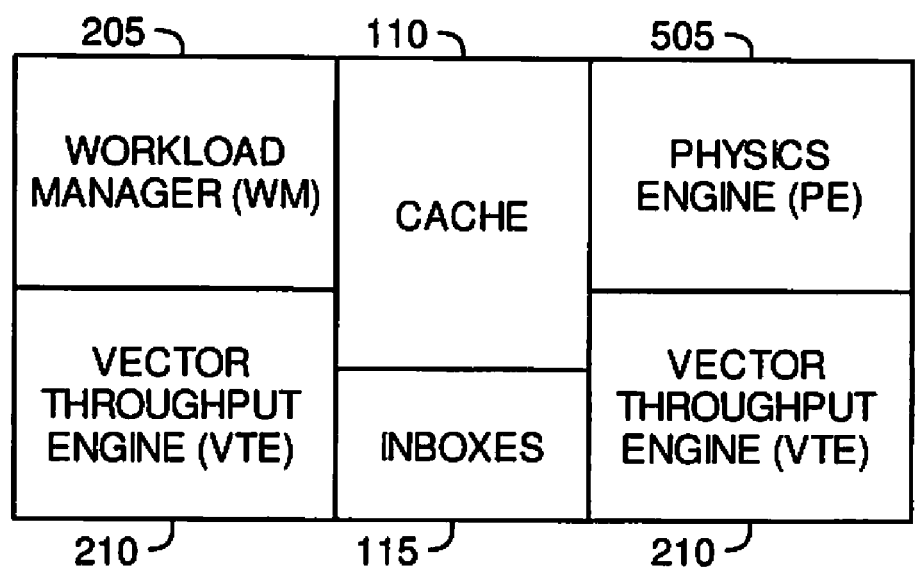

According to one embodiment of the invention, a physics engine may use multiple threads on a multiple core processing element to perform physics related calculations. For example, FIG. 5 illustrates a multiple core processing element 100 wherein the threads of one of the cores are allocated to a physics engine 505. Other cores within the multiple-core processing element may perform image processing related tasks, according to embodiments of the invention. For example, one core within the multiple-core processing element 100 may be allocated to a workload manager 205 and other cores within the multiple-core processing element 100 may be allocated to vector throughput engines 210, according to one embodiment of the invention.

The multiple-core processing element 100 may have a memory cache 110 shared between all of the cores located on the multiple-core processing element 100. Furthermore, each core may have its own cache (e.g., an L1 cache). The multiple-core processing element 100 may also contain inboxes 115. The inboxes 115 may be memory mapped address space used by the cores as a communications network.

Figure 6:
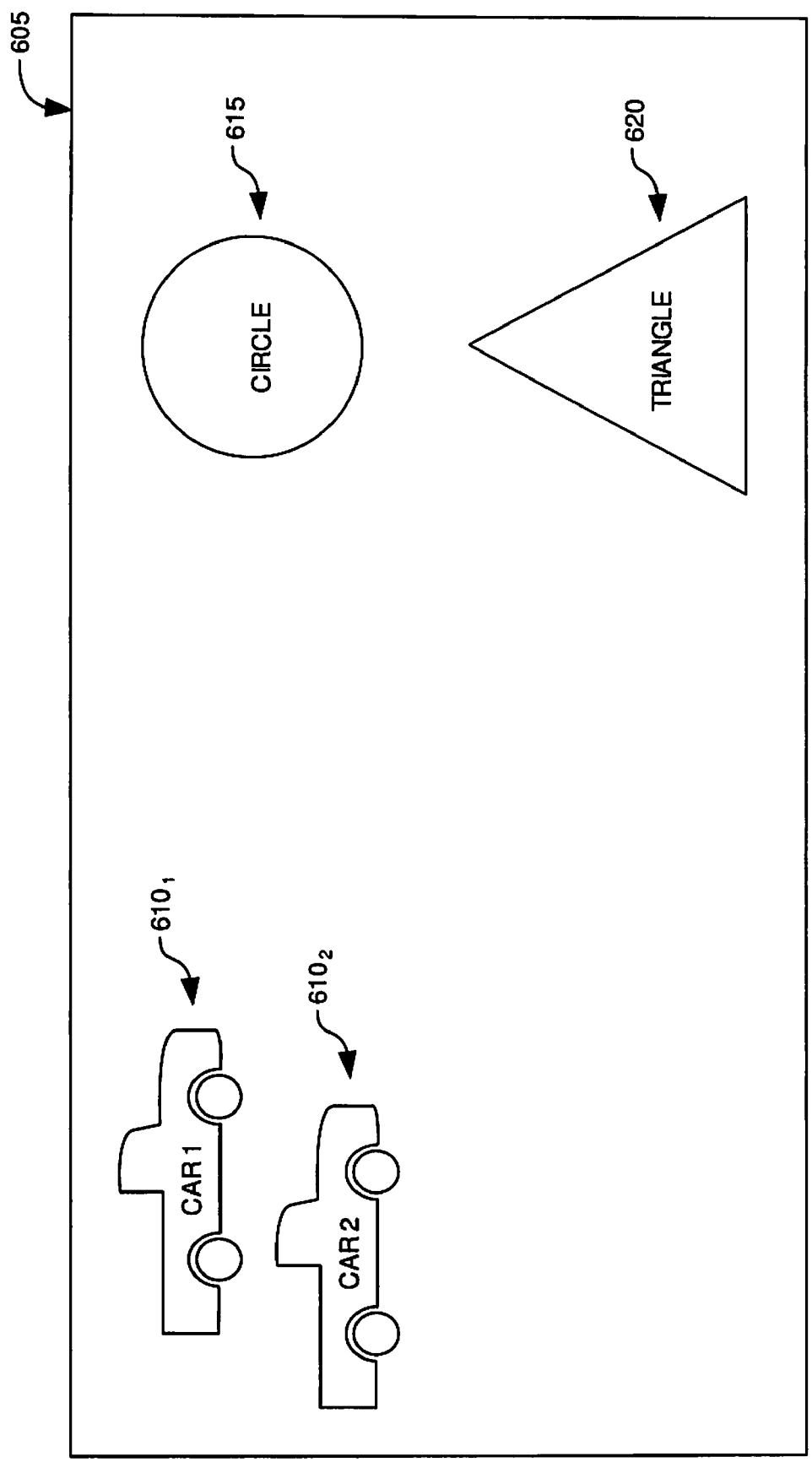
FIG. 6 illustrates an exemplary three-dimensional scene to be rendered by an image processing system, according to embodiments of the invention.

FIG. 6 illustrates an exemplary three-dimensional scene 605. The three-dimensional scene 605 contains several objects including a first car object $610_1$, a second car object $610_2$, a circle object 615, and a triangle object 620. A physics engine may simulate real world physical phenomena as applied to the objects (i.e., $610_1$, $610_2$, 615, and 620) within the three-dimensional scene 605 illustrated in FIG. 6.

One structure a physics engine may use to keep track of objects in a three-dimensional scene is a scene graph or a scene index. On a frame to frame basis, the physics engine 505 may use a scene graph to store and access information which defines the objects located within the three-dimensional scene. The scene graph may use a hierarchical structure (e.g., a tree) to index or order the objects.

Figure 7:
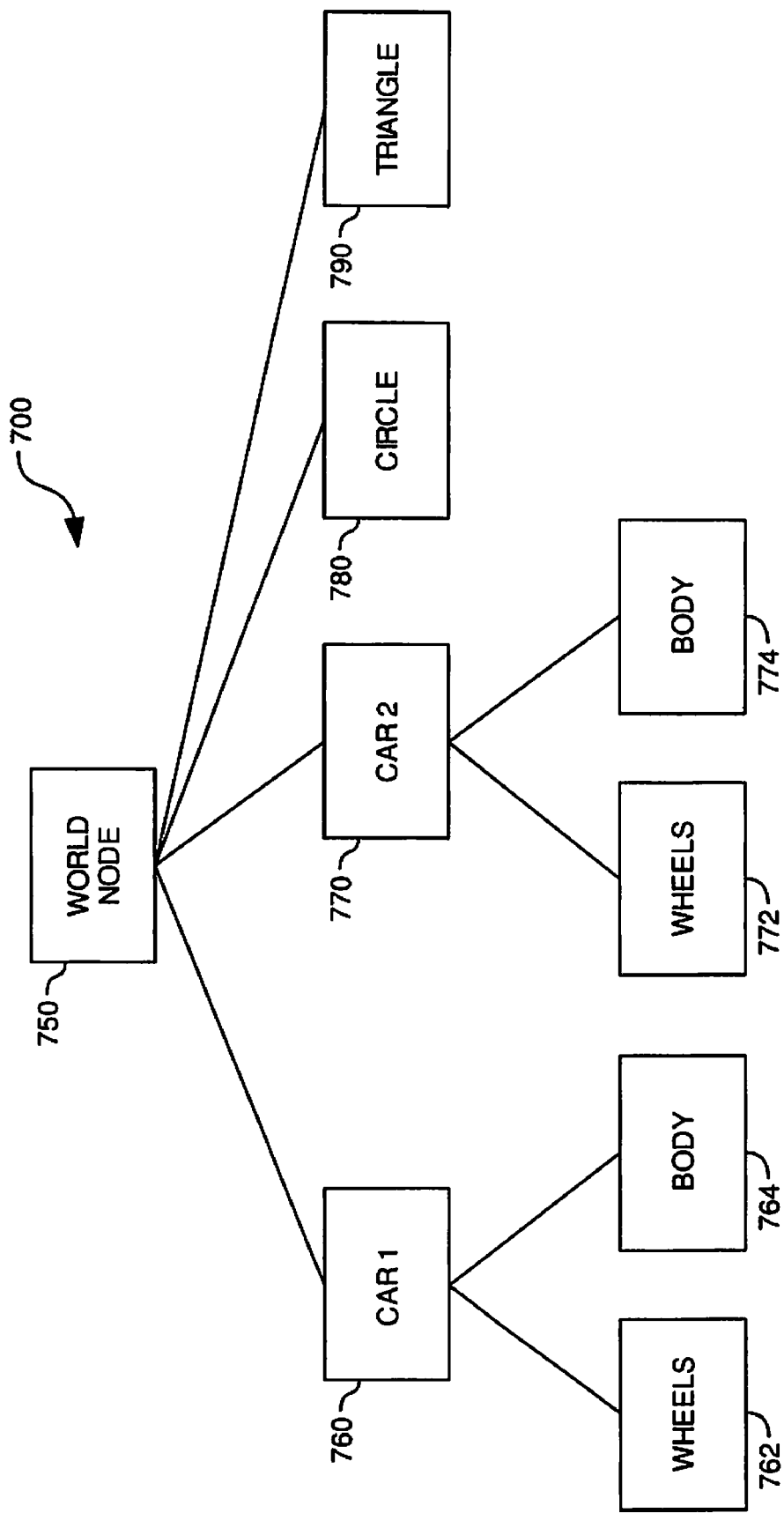
FIG. 7 illustrates a scene graph, according to one embodiment of the invention.

For example, FIG. 7 illustrates an exemplary scene graph 700, according to one embodiment of the invention. As illustrated, the scene graph 700 may contain a world node 750 which represents the entire three-dimensional scene 605. The world node 750 may branch to nodes which represent objects within the three-dimensional scene. For example, the world node 750 may branch to four object nodes. Each of the four object nodes in the scene graph 700 may correspond to one of the four objects within the three-dimensional scene 605 of FIG. 6 (i.e., a node 760 corresponding to the first car object $610_1$, a node 770 corresponding to the second car object $610_2$, a node 780 corresponding to the circle object 615, and a node 790 corresponding to the triangle object 620).

The object nodes may branch to other nodes on a lower level of the scene graph 700. The branched to nodes may represent objects which make up part of the larger object or may be nodes which define the object (position, color, mass, etc.). For example, the node 760 representing the first car object branches to a node 762 representing a wheels object and to a node 764 representing a body object. Thus, the scene graph is a hierarchical acceleration data structure based on objects located within a three-dimensional scene.

The scene graph may be stored, for example, in a memory cache (e.g., cache 110) of a processing element to enable the physics engine 505 fast access to the information contained within the scene graph 700. Because a scene graph 700 is an object oriented structure and a physics engine performs calculations on an object by object basis, a scene graph is an efficient structure to use with a physics engine.

In contrast to a physics engine using a scene graph, an image processing system may use a spatial index (e.g., a kd-tree) to render a two-dimensional image from a three-dimensional scene. As described previously with respect to FIG. 4, a spatial index partitions a three-dimensional scene based on a spatial or bounding volume hierarchy. Because a scene graph is a spatial based structure and a ray tracing image processing system performs calculations based on where a ray traverses through a three-dimensional scene, a spatial index is an efficient structure to use with a ray tracing image processing system.

Figure 8:
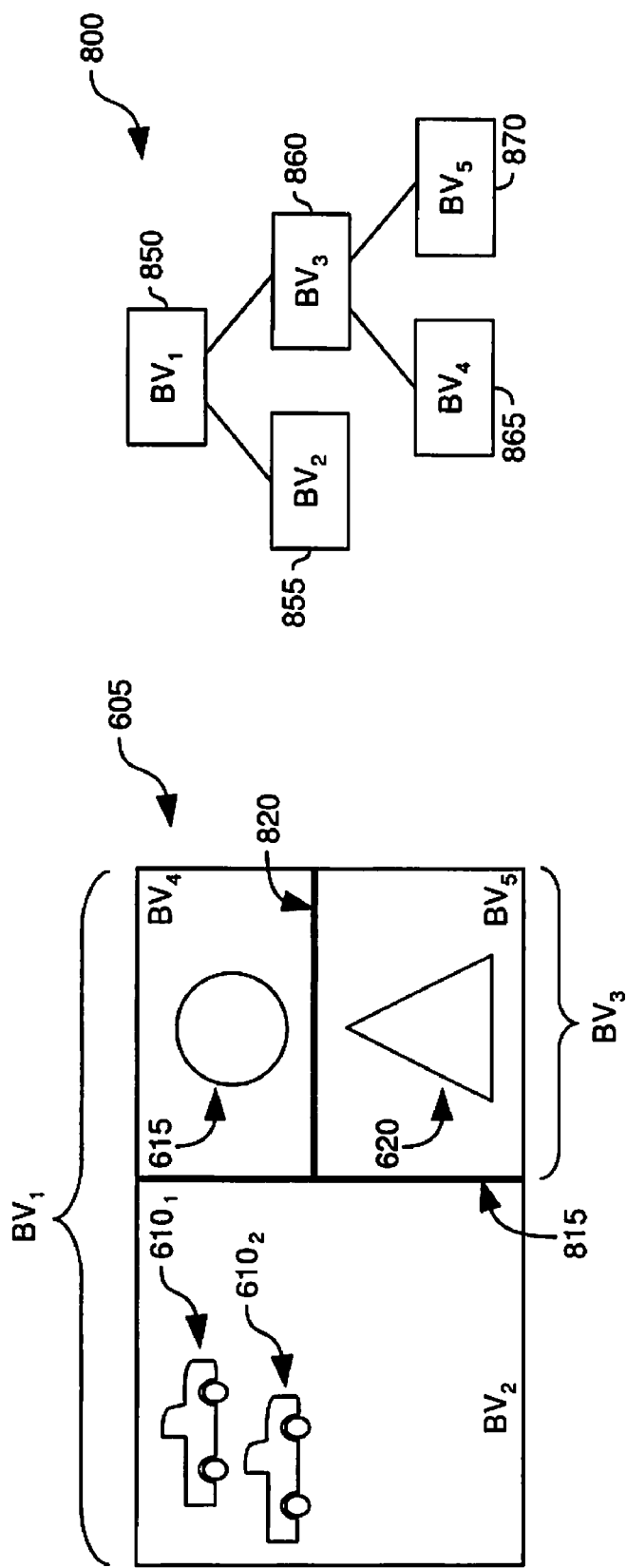
FIG. 8 illustrates a three-dimensional scene to be rendered by an image processing system and a corresponding spatial index, according to one embodiment of the invention.

FIG. 8 illustrates a spatial index 800 which may be used by an image processing system to render a two-dimensional image from the three-dimensional scene 605. The three-dimensional scene 605 illustrated in FIG. 7 may be the same three-dimensional scene 605 to which the scene graph 700 corresponds.

The spatial index 800 may contain a world node 850 which defines bounding volume 1 ($BV_1$) which encompasses the entire volume of the three-dimensional scene 605. $BV_1$ may be partitioned into two smaller bounding volumes $BV_2$ and $BV_3$ through the use of a splitting plane 815. The partitioning of $BV_1$ is reflected in the kd-Tree as the two nodes 855 and 860, corresponding to $BV_2$ and $BV_3$ respectively, under the internal or parent node $BV_1$ 850. The internal node 850 representing $BV_1$ may now store information such as, but not limited to, pointers to the two nodes beneath $BV_1$ (e.g., $BV_2$ and $BV_3$), along which axis the splitting plane 815 was drawn (e.g., x-axis), and where along the axis the splitting plane 815 was drawn.

Furthermore, $BV_3$ may be partitioned into two smaller bounding volumes $BV_4$ and $BV_5$. Two leaf nodes 865 and 870 in the spatial index may correspond to the bounding volumes $BV_4$ and $BV_5$, respectively.

The leaf nodes (i.e., 855, 865, and 870) of the spatial index 800 may include information which defines the corresponding bounding volumes within the three-dimensional scene (i.e., $BV_2$, $BV_4$ and $BV_5$) and may contain pointers to primitives located within the corresponding bounding volumes.

On a frame to frame basis, objects within the three-dimensional scene may move or change shape. In response to changes in position or shape of objects, the spatial index may need to be updated such that the spatial index accurately reflects the location of objects or primitives within the three-dimensional scene. Similarly, a scene graph used by the physics engine 505 may also need to be updated to accurately reflect the new position or shape of objects within the three-dimensional scene. Thus, in response to objects moving or changing shape, two data structures may need to be updated on a frame to frame basis.

The image processing system may store the spatial index 800, for example, in the memory cache (e.g., cache 110). As previously described, a scene graph may also be stored in the memory cache 110 of the multiple core processing element 100. However, in some circumstances the memory cache 110 may not have enough storage space available to efficiently store both the scene graph 700 and the spatial index 800.

Integrated Acceleration Data Structure for Physics and Ray Tracing Image Processing According to embodiments of the invention, an integrated acceleration data structure may be used by both the physics engine 505 and the image processing system in order to perform both physics calculations and to perform ray tracing respectively. A single integrated acceleration data structure may perform the functions of a spatial index and may simultaneously perform the functions of a scene graph. By using a single integrated acceleration data structure rather than using two data structures, the amount of space required to store information sufficient for both the physics engine 505 and the image processing system to perform their respective tasks may be reduced. Furthermore, in contrast to the need to update two data structures in response to movements of objects within the three-dimensional scene, the image processing system may only need to update a single data structure (i.e., the integrated acceleration data structure). The processing time gained by only updating a single data structure may reduce the time necessary to perform physics engine tasks and image processing tasks, thus increasing overall system performance.

According to one embodiment of the invention, an integrated spatial index may be formed by initially partitioning a three-dimensional scene into bounding volumes that encompass objects within the three-dimensional scene. Accordingly, the initial or top portions of the integrated acceleration data structure are formed based on a spatial or bounding volume hierarchy. Once a bounding volume encompasses an object within the three-dimensional scene, an object oriented hierarchy may be used to represent the object within the bounding volume. Thus, the lower portions of the integrated acceleration data structure are formed based on an object oriented hierarchy. Consequently, the initial or top portions of the integrated acceleration data structure may resemble a spatial index 800 (e.g., a kd-tree) and the lower portions of the integrated acceleration data structure may resemble a scene graph 700.

Figure 9:
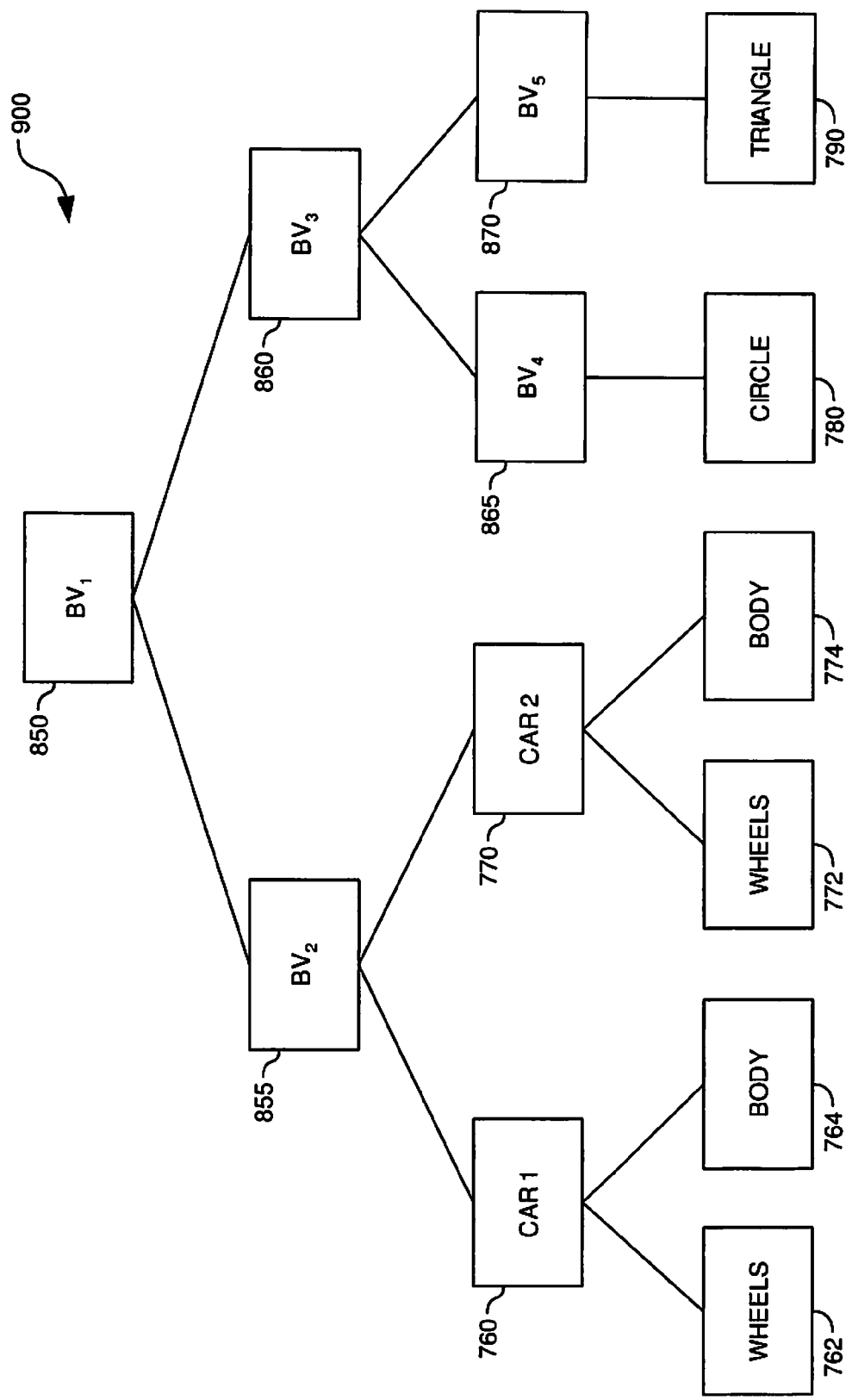
FIGS. 9, 11 and 15 illustrate integrated acceleration data structures, according to embodiments of the invention.

FIG. 9 illustrates an integrated acceleration data structure 900, according to one embodiment of the invention. The exemplary integrated acceleration data structure 900 corresponds to the three-dimensional scene 605 illustrated in FIG. 6.

The integrated acceleration data structure 900 illustrated in FIG. 9 has an initial structure defined by the spatial index 800 which was described with reference to FIG. 8, having a world node and smaller bounding volumes.

According to embodiments of the invention, in order to form an integrated acceleration data structure 900, the nodes which define bounding volumes within the three-dimensional scene may branch to (i.e., contain information which points to) nodes which define objects located within bounding volumes. Thus, in contrast to a spatial index where the final spatially oriented nodes (i.e., the leaf nodes) only point to primitives, the final spatially oriented nodes in an integrated acceleration data structure 900 may branch to object nodes which define objects.

For example, as illustrated in FIG. 9, node 855 corresponding to $BV_2$ may branch to object nodes 760 and 770 (representing the first car object $610_1$ and the second car object $610_2$) from the scene graph 700. The object nodes 760 and 770 are branched to from the node 855 corresponding to $BV_2$ because the first car object $610_1$ and the second car object $610_2$ are both located within bounding volume $BV_2$ as illustrated in FIG. 8.

Similar to the scene graph 700, the nodes branched to from each object node in the integrated acceleration data structure 900 may continue to define properties of the objects or portions of the object which collectively construct the object. For example, each car object node branches to a wheel object node (e.g., 762 or 772) and a body object node (e.g., 764 or 774), which further define each car object.

Also illustrated in the integrated acceleration data structure 900 are nodes corresponding to the remaining objects in the three-dimensional scene 605. For example, the circle object node 780 is branched to from the node 865 defining the bounding volume $BV_4$. The circle object node 780 may be branched to from the node 865 defining bounding volume $BV_4$, because the circle object 615 is located within bounding volume $BV_4$. Furthermore, the triangle object node 790 is branched to from the node 870 defining the bounding volume $BV_5$. The triangle object node 790 may be branched to from the node 865 defining bounding volume $BV_5$, because the triangle object 620 is located within bounding volume $BV_5$.

In order for a physics engine 505 or an image processing system to determine if a node corresponds to an object or to a bounding volume, each node within the integrated acceleration data structure may contain an object node flag or bit. The object node bit may be a single bit located within the memory space which defines a node within the integrated acceleration data structure 900. According to one embodiment of the invention, if a node within the spatial index is an object node, the object node bit may be asserted. Furthermore, if a node within the spatial index is not an object node, the object node bit may not be asserted. Thus, a physics engine 505 performing physics calculations or the image processing system performing ray tracing may be able to quickly determine if the node is an object node or a node defining a bounding volume by determining if the object node bit is asserted.

Integrated Acceleration Data Structure Usage

According to embodiments of the invention, an image processing system may perform ray tracing with an integrated acceleration data structure. As described with regards to FIG. 4, when using a spatial index (e.g., a kd-tree) the image processing system may use a workload manager 205 to issue rays into the three-dimensional scene and to trace the rays (based on the trajectory of the ray) through the three-dimensional scene. The workload manager 205 may trace rays through the three-dimensional scene using the spatial index by performing ray-bounding volume intersection tests against the bounding volumes defined by the nodes in the spatial index. The workload manager 205 may take branches to nodes based on which bounding volumes are intersected by the ray. When the workload manager 205 traverses to a certain point within the spatial index (e.g., a leaf node defining a bounding volume), the workload manager 205 may send the ray to a vector throughput engine 210 to determine if the ray intersects any primitives (e.g., contained within the bounding volume defined by the leaf node). If the ray intersects a primitive, the vector throughput engine 210 may consequently determine the color contribution to the two-dimensional image based on an intersected primitive. If not, the workload manager 205 may traverse the kd-tree again to determine if the ray intersects any other primitives located within the three-dimensional scene.

The image processing system may use an integrated acceleration data structure 900 to perform ray tracing, in a manner similar to using a spatial index. The image processing system may issue rays into the three-dimensional scene and trace rays through the three-dimensional scene using the integrated acceleration data structure 900 by performing ray-bounding volume intersection tests against the bounding volumes defined by the spatially oriented nodes in the spatial index. The workload manager 205 may take branches to nodes based on which bounding volumes are intersected by the ray. When the workload manager 205 traverses to a certain point within the integrated acceleration data structure (e.g., an object node), the workload manager 205 may send the ray to a vector throughput engine 210 to determine if the ray intersects any primitives. However, according to other embodiments of the invention, the workload manager 205 may determine if the ray intersects any primitives.

Furthermore, the physics engine 505 may perform physics related tasks using the integrated acceleration data structure. When using a scene graph the physics engine may determine the effect of physical phenomena on objects within the three-dimensional scene 605 on an object-by-object basis. The physics engine 505 may perform the same physics calculations with an integrated acceleration structure on an object-by-object basis by searching for object nodes within the integrated acceleration data structure 900. The physics engine 505 may determine if a node is an object node by checking the object node bit in the information which defines the node. Once a node is found within the integrated acceleration data structure that has its object node bit asserted, the physics engine may perform physics calculations on the object.

Thus, by forming a data structure which uses both a spatial (or bounding volume) oriented hierarchy and an object oriented hierarchy, a single data structure may be formed which may be used by both the image processing system and the physics engine 505.

Although in the preceding example the integrated acceleration data structure 900 has been described wherein each entire object may be contained within a single bounding volume, in some circumstances portions of objects may be located within two separate bounding volumes. That is, objects within the three-dimensional scene may be divided by a splitting plane which creates a boundary between bounding volumes. Consequently, portions of an object may be located within separate bounding volumes created by the splitting plane.

In this scenario, according to one embodiment of the invention, the information defining an object node may contain a bit location which indicates that information which defines the entire object is located within a plurality of object nodes within the integrated acceleration data structure. The bit within the information defining an object node may be asserted to indicate that information which defines the object may be located within a plurality of object nodes of the integrated acceleration data structure, and de-asserted to indicate that the information which defines the object is located entirely within the current object node.

Furthermore, if an object node which contained only a portion of an object was created when constructing the integrated acceleration data structure, a pointer to another object node (or nodes) which contain the remaining information which defines the object may be stored in each object node (which contains a portion of the object, according to one embodiment of the invention. Thus, the physics engine may quickly find the other object node(s) within the integrated acceleration data structure. By using a bit within the information defining an object node to indicate whether or not the object is defined within a plurality of object nodes, the likelihood may be reduced that a physics engine 505 performing position updates or collision detection tests fails to perform tests against all of the portions of an object located within the three-dimensional scene.

Figure 10:
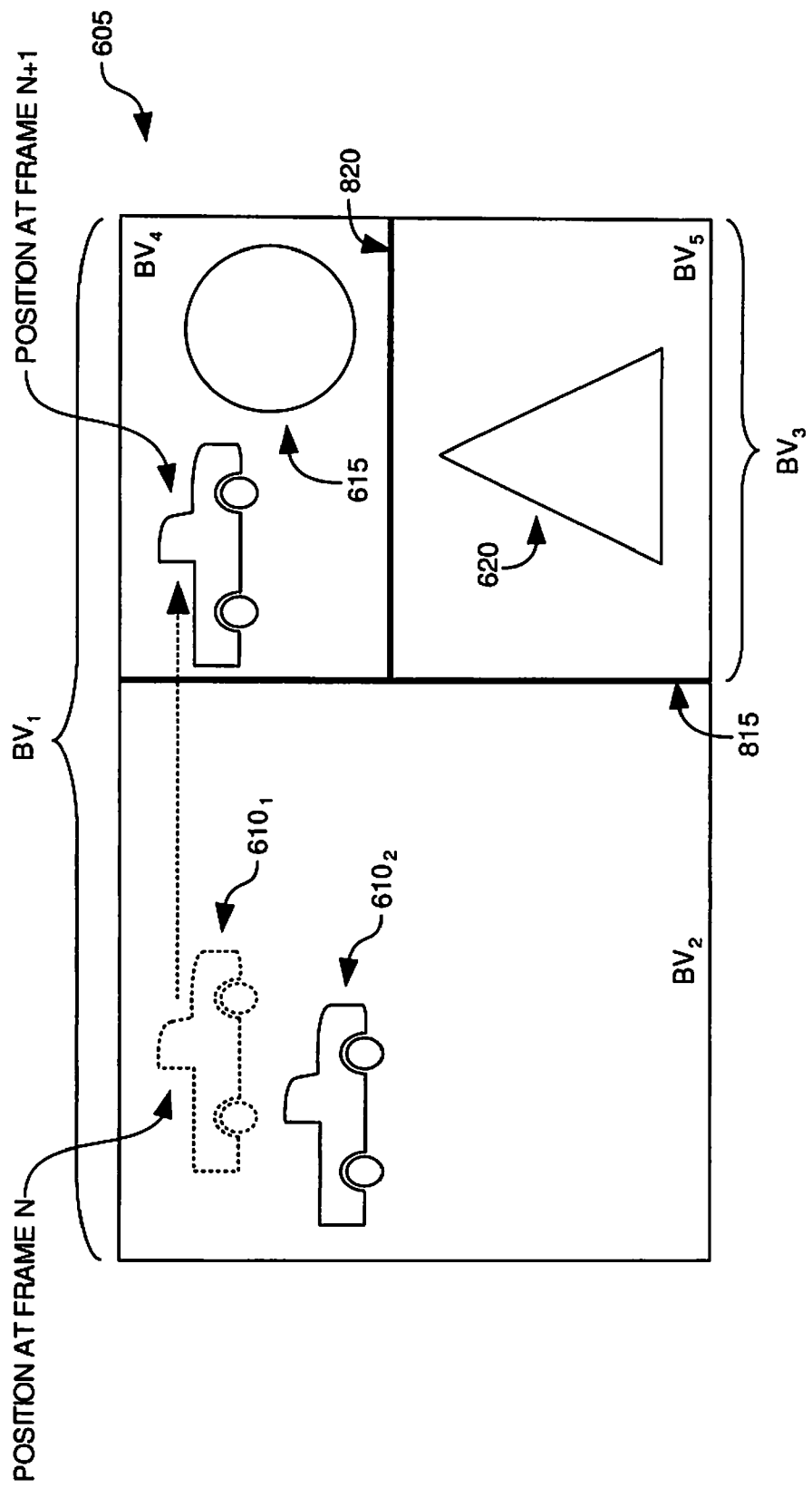
FIG. 10 illustrates a three-dimensional scene to be rendered by an image processing system, according to one embodiment of the invention.

Updating an Integrated Acceleration Data Structure in Response to Object Movements According to embodiments of the invention, an integrated acceleration data structure 900 may be used to maintain a record of movements or changes to objects located within the three-dimensional scene. For example, in contrast to the three-dimensional scene 605 illustrated in FIG. 6, FIG. 10 illustrates a three-dimensional scene 605B where the first car object $610_1$ has moved from a first position in the frame N of the three-dimensional scene 605 to a second position in frame N+1 of the three-dimensional scene 605 (as illustrated by the dashed lines in FIG. 10).

In response to the movement of the first car object $610_1$, hardware or software components within the image processing system may update the integrated acceleration data structure 900.

According to one embodiment of the invention, the physics engine 505 may update the integrated acceleration data structure 900 to reflect change in position or shape of objects within the three-dimensional scene 605. The physics engine 505 may perform position updates and collision detection tests for all of the objects located within the three-dimensional scene. For example, the object node 760 corresponding to the first car object 610₁ may be updated to reflect the new position of the first car object 610₁. After performing the tests, the physics engine 505 may record the results of the calculations (e.g., the new positions of the objects) in the integrated acceleration data structure 900.

Furthermore, if an object has moved such that the branches to nodes within the integrated acceleration data structure need to be updated, the physics engine 505 may update the branches as well. For example, the movement of the first car object 610₁ from its position illustrated in frame N of the three-dimensional scene 605 (as seen in FIG. 7) to its position illustrated in frame N+1 of the three-dimensional scene (as seen in FIG. 10) may require that the physics engine 505 update the position of the first car object 610₁ in the integrated acceleration data structure 900. Furthermore, as illustrated in FIG. 10 the first car object has moved to such a degree that it is no longer located within the bounding volume BV₂, rather the first car object 610₁ has moved such that it is located within the bounding volume BV₄. Thus, the physics engine 505 may update the integrated acceleration data structure 900 so that the node 865 corresponding to BV₄ branches to the object node 760 corresponding to the first car object 610₁.

Figure 11:
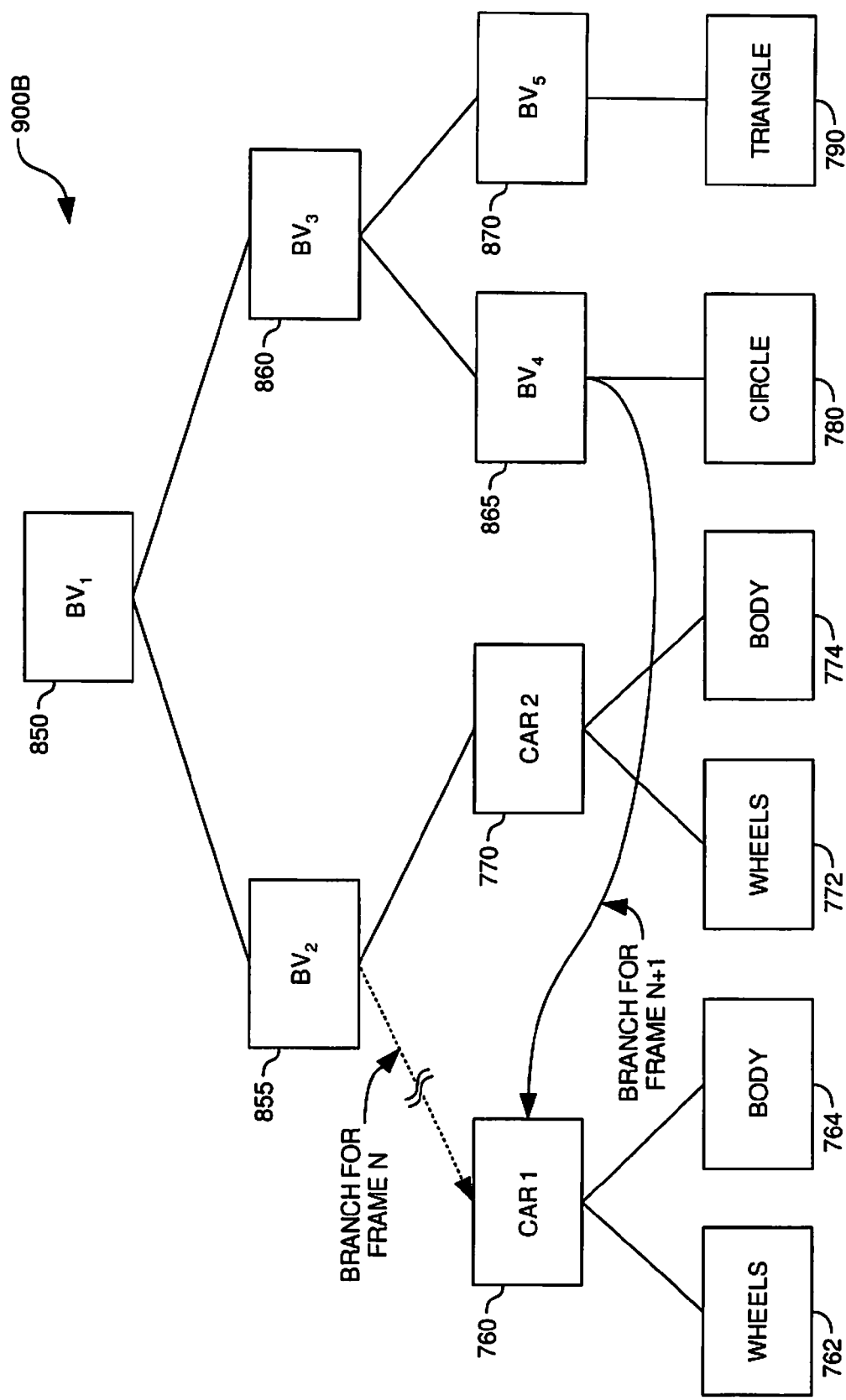

For example, FIG. 11 illustrates an updated integrated acceleration data structure 900B which reflects the new position of the first car object 610₁. The branch from the node 855 corresponding to BV₂ to the object node 760 corresponding to the first car object 610₁ may have been removed or deleted by the physics engine 505 to reflect the movement of the first car object 610₁ out of the bounding volume BV₂. Furthermore, a new branch from the spatial index node 865 corresponding to BV₄ to the object node 760 corresponding to the first car object 610₁ may have been added by the physics engine 505 to reflect the movement of the first car object 610₁ into the bounding volume BV₄. Thus, the new position of the first car object 610₁ in the three-dimensional scene 605 is now reflected in the updated integrated acceleration data structure 900B.

As illustrated in FIG. 11, the remaining nodes and branches in the updated integrated acceleration data structure 900B are the same as in the integrated acceleration data structure 900 because (in this simple example) no other objects moved from frame N to frame N+1. The image processing system may now use the updated integrated acceleration data structure 900B to render a two-dimensional image from the three-dimensional scene 605, and the physics engine 505 may use the updated integrated acceleration data structure 900B to perform physics related calculations.

Physics Engine Collision Detection

As mentioned above, one function of a physics engine is to perform collision tests. Collision tests may determine, for example, if an object which is moving within the three-dimensional scene collides with any other objects within the three-dimensional scene. If the moving object collides with any other objects, the physics engine may also perform calculations to determine the effects of the collision on the moving object and the objects with which the moving object collided (e.g., new direction, position, and/or shape of the objects). The physics engine may then update a data structure (e.g., the integrated acceleration data structure) with the results of the calculations, and the image processing system may use the updated data structure to render a two-dimensional image of the three-dimensional scene.

Figure 12:
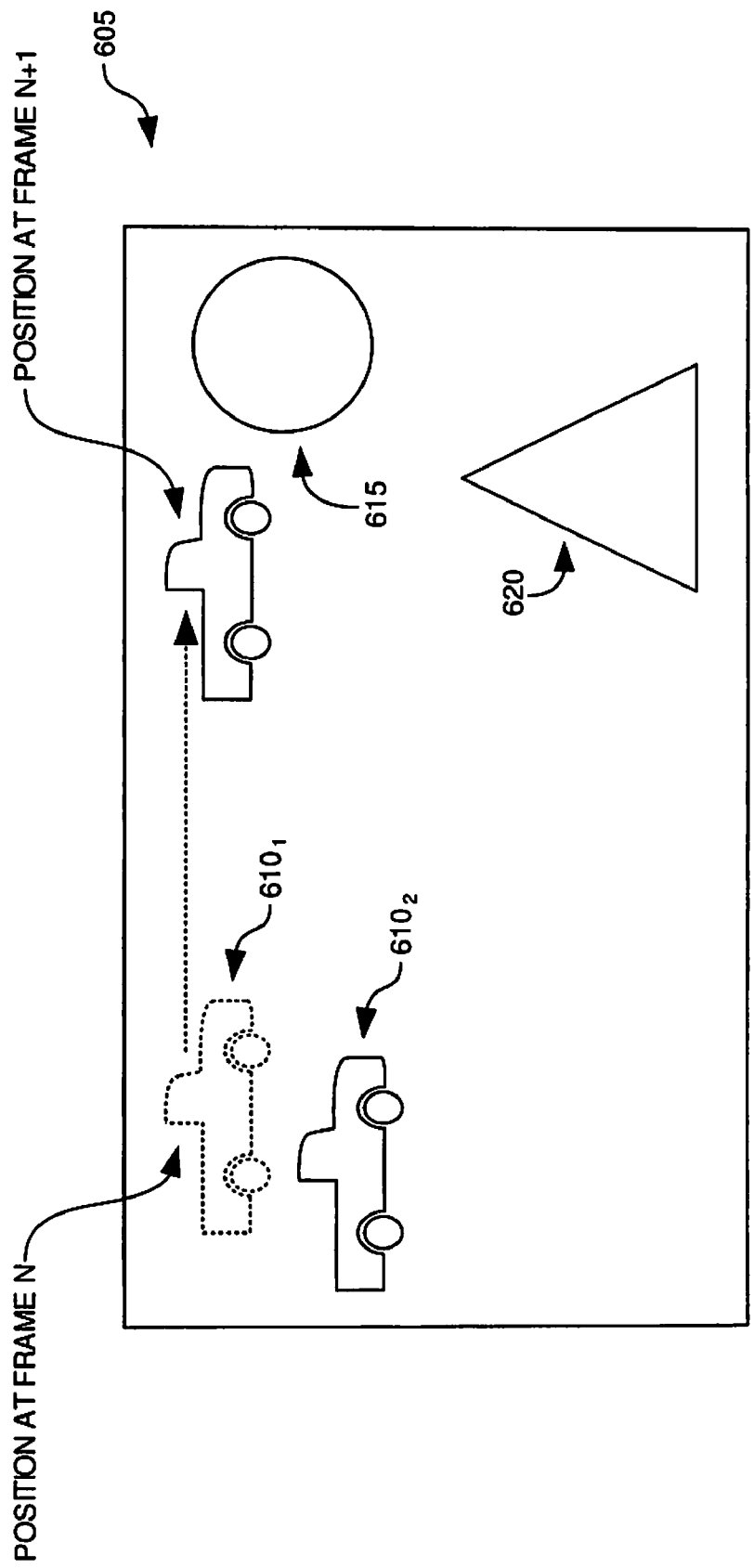
FIGS. 12, 13, and 16 illustrate exemplary three-dimensional scenes, according to embodiments of the invention.

FIG. 12 illustrates an exemplary three-dimensional scene 605 containing several objects including a first car object 610₁, a second car object 610₂, a circle object 615, and a triangle object 620. The first car object 610₁ may moving (at a given velocity) within the three-dimensional scene. Over a period of time (e.g., a single frame) the car object 610₁ may move from a first position (illustrated by the dashed outline of the car object 610₁) to a second position.

In order to provide realistic simulation of physical phenomenon, the physics engine may perform collision tests (collision detection tests) with the first car object 610₁ and each of the other objects within the three-dimensional scene to determine if the first car object 610₁ collides with any other objects within the three-dimensional scene over the time period (e.g., for a single frame).

For example, the physics engine may perform collision tests with the first car object 610₁ and the second car object 610₂, the first car object 610₁ and the circle object 615, and the first car object 610₁ and the triangle object 620. Although this technique may determine which objects collide with the moving object, the technique may execute collision tests with objects which are unlikely to collide with the moving object. For example, this technique may execute a collision test with the first car object 610₁ and the triangle object 620 which are relatively far away from one another and are unlikely to collide. Therefore, this technique may be inefficient in determining collisions between the moving object and other objects.

However, a physics engine may reduce the number of collision tests which may be performed by only performing collision tests with objects that are likely to collide with the moving object. The physics engine may determine which objects are likely to collide with the moving object by creating a bounding volume which encloses the path of the moving object from the first position to the second position (hereinafter a "velocity box") and performing intersection tests with the velocity box and every other object within the three-dimensional scene. The objects which intersect the velocity box may be more likely to collide with the moving object. Therefore, the physics engine may use the objects which intersect with the velocity box to perform collision tests with the moving object to determine which objects collide with the moving object. Consequently, the number of collision tests may be reduced by the number objects which do not intersect the velocity box.

In contrast to an object-to-object collision test, a test for an intersection of the velocity box and an object within the three-dimensional scene may take less time and processing power. For example, a collision test may require many more variables such as the velocity of the moving object, direction in which the moving object is traveling, the coordinates of both objects (i.e., the moving object and the object being tested), and the dimensions of both objects. Whereas, an intersection test may simply require the dimensions and coordinates of the velocity box and the dimensions and coordinates of the other object being tested for an intersection with the velocity box. Consequently, it may be more efficient to execute intersection tests using a velocity box than to execute collision tests with every object within the three-dimensional scene.

Figure 13:
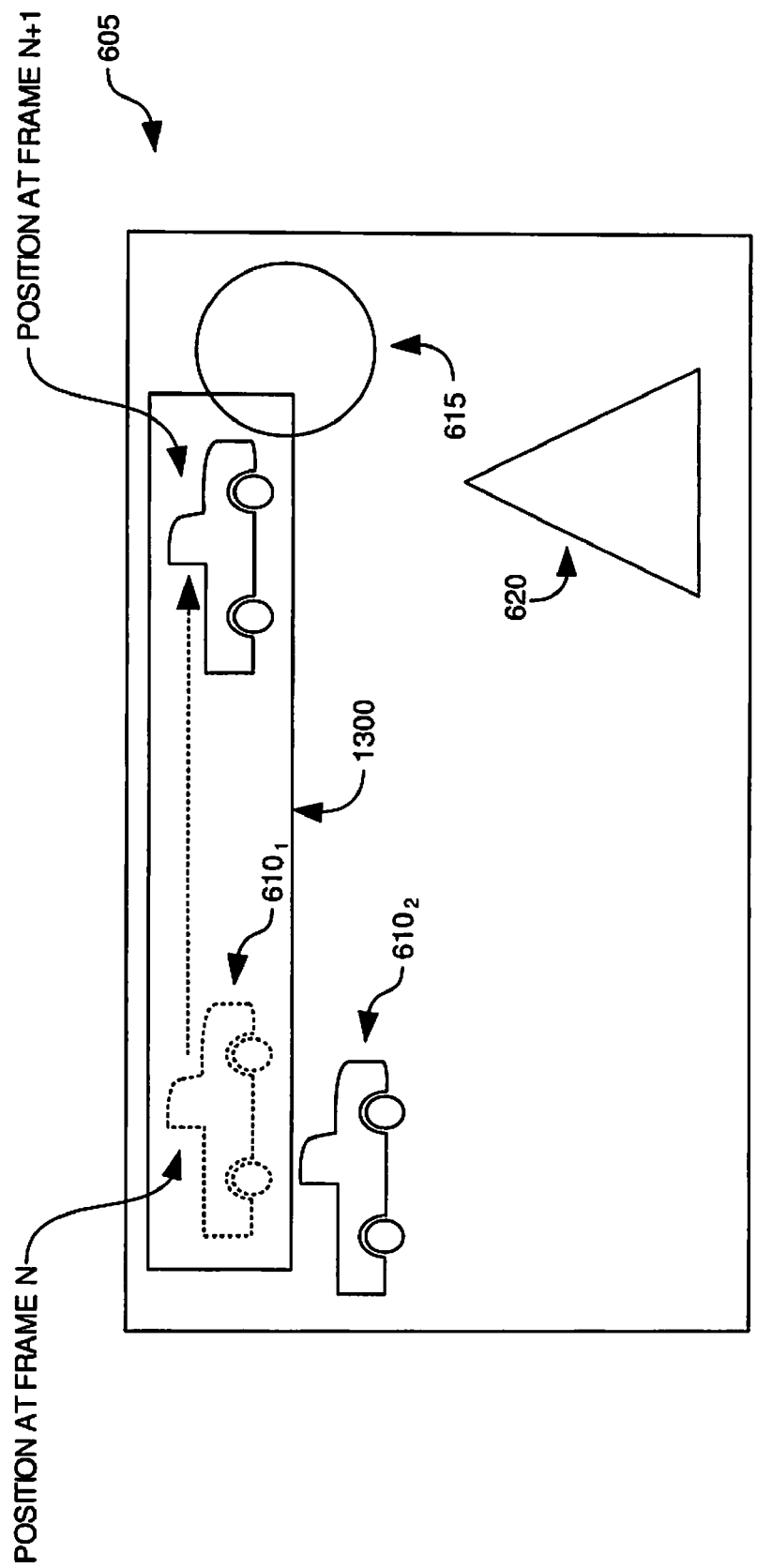

FIG. 13 illustrates an exemplary velocity box 1300 which encloses the moving first car object 610₁. As illustrated the velocity box 1300 may be a simple rectangular box the dimensions of which are based on the dimensions of the moving object and the distance the moving object may move over the period of time under evaluation. The evaluation time period may be the period of a frame, or may be shorter and iterated many times for a single frame to prevent adverse effects (e.g. tunneling).

The velocity box may also be a more complex shape (e.g., a cylinder) which better reflects the path of the object from its initial position to its final position. A more complex shape may further reduce the number of objects which may collide with the velocity box. The complexity of the shape of the velocity box created by the physics engine may ultimately depend on a balance between the processing time necessary for the physics engine to create a more complex velocity box and the number of collision tests which may be reduced by creating a more complex velocity box.

After creating the velocity box 1300 the physics engine may perform intersection tests with the velocity box 1300 and objects within the three-dimensional scene 605. For example, intersection tests may be performed with the velocity box 1300 and the second car object 610₂, the velocity box 1300 and the circle object 615, and the velocity box 1300 and the triangle object 620. As a result of performing these intersection tests, the physics engine may determine that the velocity box 1300 intersects the circle object 615 (the intersection of the velocity box 1300 and the circle object 615 is illustrated in FIG. 13). Thus, a collision between the first car object 610₁ and the circle object 615 may be likely. Consequently, the physics engine may only need to perform a single collision detection test (i.e., with the first car object 610₁ and the circle object 615).

By determining which objects are likely to intersect the moving first car object 610₁ the physics engine was able to reduce the number of collision tests from three tests to one test. Although testing objects within the three-dimensional scene for intersections with the velocity box may add to the total number tests which may need to be performed from three tests to four tests (i.e., one collision test plus three intersection tests), the increase in tests will be less computationally expensive and consume less time than executing three collision tests. Therefore, the overall result may be a reduction in the time necessary to determine if the moving object collides with any other objects.

Box Casting Using an Integrated Acceleration Data Structure

Although intersection tests with a velocity box may reduce the number of collision tests which may need to be performed by the physics engine, the physics engine may still need to perform intersection tests with the velocity box and each object within the three-dimensional scene in order to determine which objects are likely to collide with the moving object. In a complicated three-dimensional scene containing many objects, this may result in a large number of intersection tests which may need to be performed to determine which collisions with the moving object are likely.

However, according to one embodiment of the invention, a physics engine may use the spatial information stored in the integrated acceleration data structure to determine which objects within the three-dimensional scene are within the same area as the velocity box and thus are likely to intersect the velocity box. Similar to how an image processing system may cast a ray into a three-dimensional scene and traverse the integrated acceleration data structure to determine objects which are intersected by the ray, according to embodiments of the invention, the physics engine may cast a velocity box into the three-dimensional scene and traverse the velocity box (based on the dimensions and location of the velocity box) through the integrated acceleration data structure to determine which bounding volumes the velocity box intersects (i.e., a portion of the velocity box exists within a bounding volume). The physics engine may then perform intersection tests with objects within the intersected bounding volumes (i.e., objects which are in the same area as the velocity box) which are more likely to intersect the velocity box.

Conversely, objects which are in bounding volumes which are not intersected by the velocity box may be excluded by the physics engine when performing intersection tests, because they are not in the same area as the velocity box and thus will not intersect the velocity box. Therefore, in contrast to a physics engine performing intersection tests with the velocity box and every other object within the three-dimensional scene, the physics engine may perform intersection tests with objects which are in the same bounding volumes and thus the same area as the velocity box. Consequently, the physics engine may reduce the number of intersection tests which may need to be performed.

Figure 14:
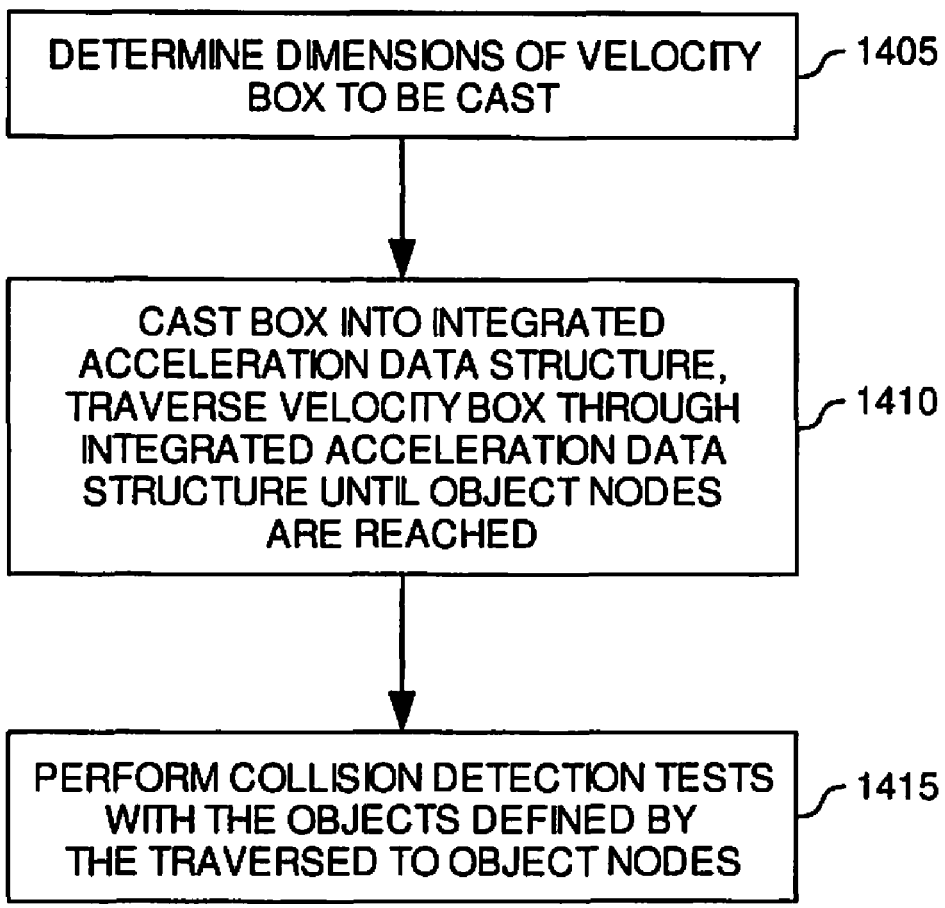
FIG. 14 is a flowchart illustrating an exemplary method of performing box casting, according to one embodiment of the invention.

FIG. 14 illustrates a method 1400 of casting a velocity box into an integrated acceleration data structure, according to one embodiment of the invention. The method 1400 may begin, for example, when a physics engine determines that an object will move within the three-dimensional scene. Initially, at step 1405, the physics engine may determine the dimensions of the velocity box to be cast into the three-dimensional scene.

As mentioned above, the dimensions of the velocity box may be determined based on the dimensions of the moving object and the amount of distance the moving object may travel over the time period under evaluation (e.g., a single frame). The dimensions of the velocity box should be such that it encompasses the moving object over the entire path of movement being evaluated. For example, the velocity box 1300 in FIG. 13 encompasses the first car object 610₁ in both its first position and its second position (i.e., the amount of distance the first car object traveled). According to embodiments of the invention, the velocity box may be created such that is an axis-aligned velocity box (i.e., sides which are parallel or perpendicular to the axes which are used to create the spatial index) or may be created such that it is not axis-aligned (i.e., sides of the velocity box not parallel or perpendicular to the axes which are used to create the spatial index). However, an axis-aligned velocity box may be easier to traverse through the integrated acceleration data structure.

Next, at step 1410, the velocity box may be cast into the integrated acceleration data structure and traversed through the integrated acceleration data structure. This may entail testing bounding volumes defined by the nodes in the integrated acceleration data structure to determine if a portion of (or the entire) velocity box intersects or is within a bounding volume defined by a node. The physics engine may begin traversing the velocity box through the integrated acceleration data structure at the world node.

If a portion of the velocity box is located within the bounding volume defined by the world node, the physics engine may take the branches to the nodes beneath the world node. The nodes beneath the world nodes may define bounding volumes which are created by a splitting plane through the bounding volume defined by the world node (e.g., an axis-aligned splitting plane). The physics engine may determine if the velocity box, or a portion of the velocity box, is within the bounding volumes defined by the nodes below the world node. If so, the physics engine may take the branches from the nodes below the world node to nodes beneath or on a lower level of the integrated acceleration data structure. The bounding volume intersection tests and taking branches to nodes beneath nodes which defines bounding volumes intersected by the velocity box may continue until an object node is reached or a node is reached which does not contain a portion of the velocity box. The objects which are defined by the object nodes which are traversed to may be placed into a set of objects to be used later in intersection tests with the velocity box.

Figure 15:
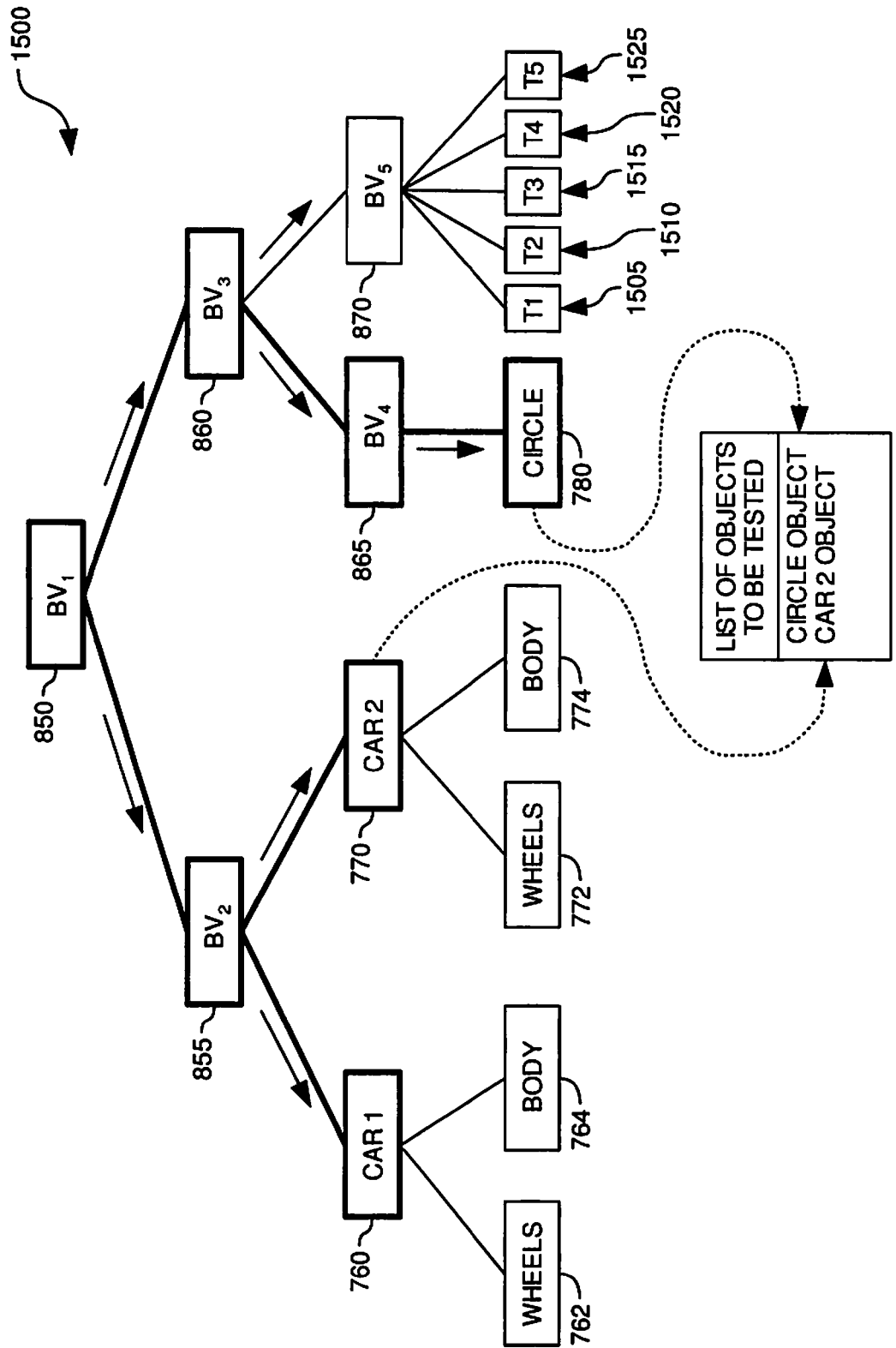
Figure 16:
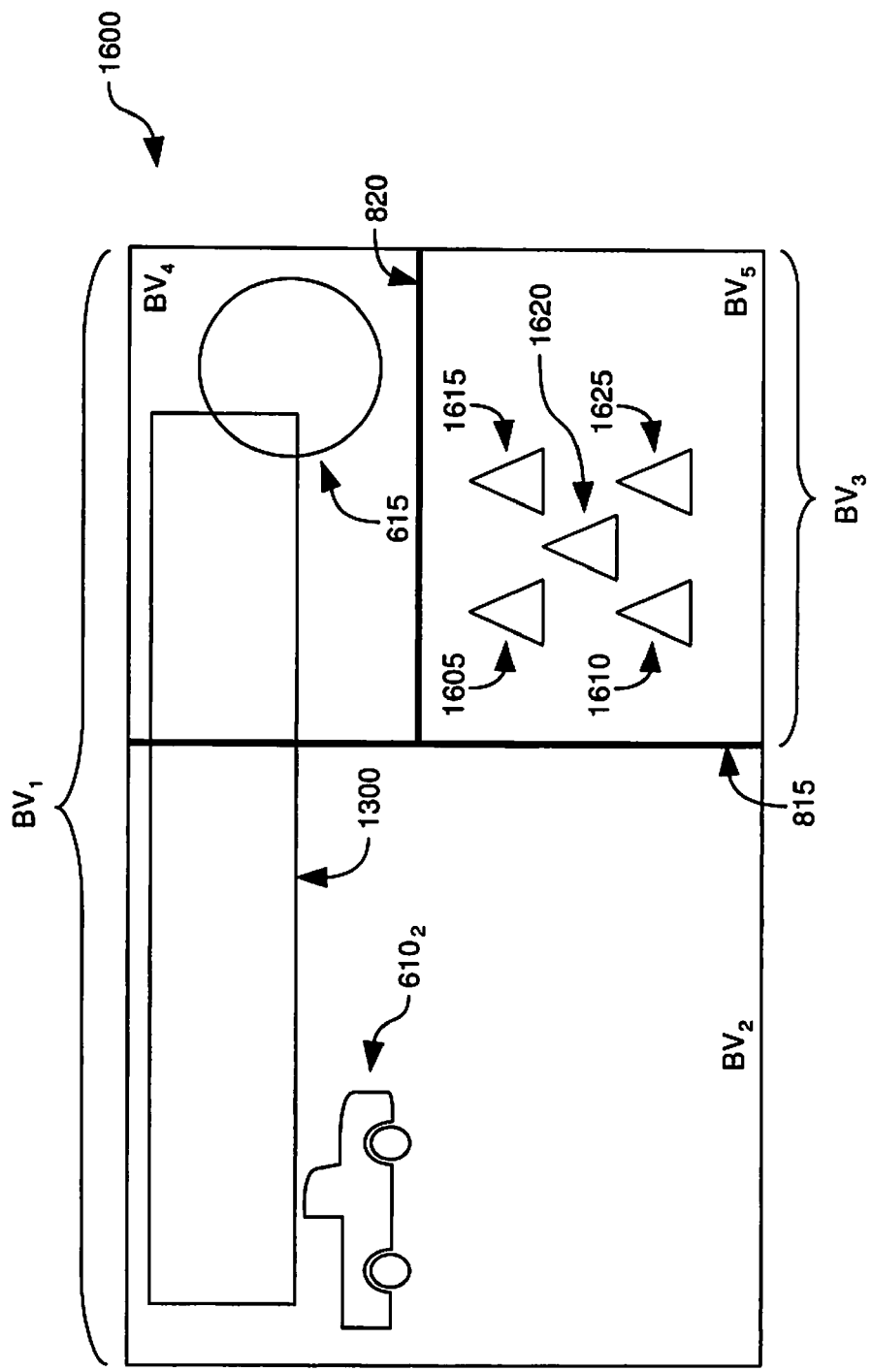

For example, FIG. 15 illustrates an integrated acceleration data structure 1500 which corresponds to a three-dimensional scene 1600 illustrated in FIG. 16. The integrated acceleration data structure contains nodes which define bounding volumes (e.g., $BV_1$-$BV_5$) within the three-dimensional scene 1600. The integrated acceleration data structure 1500 is similar to the earlier described integrated acceleration data structure 900 of FIG. 9 with the exception of several object nodes (i.e., object node 1505, object node 1510, object node 1515, and object node 1520) which correspond to objects located within a bounding volume (i.e., $BV_5$) of the three-dimensional scene 1600.

The physics engine may begin traversing the velocity box 1300 (illustrated in FIG. 1600) through the integrated acceleration data structure 1500 by determining if the velocity box 1300 is within or intersects the bounding volume defined by the world node 850 (i.e., $BV_1$). As can be seen in FIG. 16, the velocity box 1300 is within the bounding volume defined by the world node 850 (i.e., $BV_1$), and therefore the results of the physics engine's determination will indicate the intersection. An intersection of the velocity box 1300 with a bounding volume defined by nodes (e.g., world node 850) in the integrated acceleration data structure 1500 is illustrated in FIG. 15 by the darkened outline of the nodes (e.g., the darkened outline of the world node 850).

Next, the physics engine may continue to traverse the integrated acceleration data structure 1500 by taking the branches from the world node 850 to the nodes beneath the world node 850 (i.e., node 855 and node 860). The physics engine may then perform tests to determine if the velocity box 1300 intersects or is within the bounding volumes defined by the nodes beneath the world node 850 (i.e., $BV_2$ and $BV_3$). The physics engine may determine from these tests that the velocity box 1300 is within or intersects the bounding volumes defined by the nodes beneath the world node 850 (i.e., the velocity box 1300 intersects both $BV_2$ and $BV_3$). The physics engine may then continue traversing the integrated acceleration data structure 1500 by taking the branches from the intersected nodes to the nodes beneath the intersected nodes.

As illustrated in FIG. 15, the physics engine may take a branch from node 855 (defining bounding volume $BV_2$) to the first car object node 760 and another branch from node 855 to the second car object node 770. Consequently, the second car object $610_2$ is in the same areas as the velocity box 1300, and is likely to intersect the velocity box 1300. Therefore, the physics engine may add the second car object $610_2$ to a list of objects which may be used later in intersection tests to determine which objects intersect the velocity box 1300. While the first car object $610_1$ may be within the same area as the velocity box 1300, the first car object $610_1$ may be excluded from the intersection tests by the physics engine because the first car object is the moving object.

The physics engine may also take the branches from node 860 (defining bounding volume $BV_3$) to nodes beneath node 860 (i.e., node 865 and node 870). Both node 865 and node 870 define bounding volumes (i.e., $BV_4$ and $BV_5$), not object nodes. Therefore, the physics engine may perform tests to determine if the velocity box is within or intersects the bounding volumes defined by node 865 and node 870. As can be see in FIG. 16, part of the velocity box 1300 is within $BV_4$ but no portion of velocity box 1300 is within $BV_5$. Therefore, the results of the intersection tests may indicate that a portion of the velocity box is within the bounding volume defined by node 865 (i.e., $BV_4$), but that no portion of the velocity box is within the bounding volume defined by node 870 (i.e., $BV_5$). The intersection with $BV_4$ and not $BV_5$ is illustrated in FIG. 15 by the darkened outline of node 865 which corresponds to $BV_4$, but no darkened outline of node 870 corresponding to $BV_5$. Consequently, the physics engine may take branches from node 865 but not from node 870. As illustrated in FIG. 15, the branch from node 865 leads to the object node 780 which corresponds to the circle object 615 contained within bounding volume $BV_4$. Consequently, the circle object 615 may be in the same area of the velocity box 1300 and thus is likely to intersect the velocity box 1300. Therefore, the physics engine may add the circle object 615 to a list of objects which may be later used intersection tests to determine which objects intersect with the velocity box 1300. However, the physics engine may not use the objects located within $BV_5$ (i.e., triangle objects 1605-1625) and branched to from node 870 because those objects are not in the same area as the velocity box.

After the physics engine has finished traversing the velocity box through the integrated acceleration data structure, the physics engine may proceed to step 1415 of method 1400 to perform intersection tests with the list of objects which are defined by the traversed to objects nodes in the integrated acceleration data structure. The results of these intersection tests indicate which objects intersect with the velocity box and therefore are likely to collide with the moving object. The physics engine may use those objects when performing collision tests with the moving object. The results of the collision tests may indicate which objects actually collide with the moving object. Consequently, the physics engine may calculate new positions of the moving object and the objects which intersect the moving object and store the new positions, for example, within the integrated acceleration data structure. The image processing system may use the updated integrated acceleration data structure to render a two-dimensional image using the new positions of the objects in the three-dimensional scene.

For example, as was determined by traversing velocity box 1300 through the integrated acceleration data structure 1500, the physics engine may perform intersection tests with the second car object $610_2$ and the circle object 615 which were contained within the traversed to bounding volumes (i.e., $BV_2$ and $BV_4$, respectively). The intersection tests may determine that only the circle object 615 intersects the velocity box 1300. Consequently, the physics engine may perform a collision test with the moving object (i.e., the first car object 6101) and the circle object 615. In contrast to a physics engine which does not cast the velocity box into the three-dimensional scene and traverse the velocity box through the three-dimensional scene, the physics engine may reduce the number of velocity box/object intersection tests by five. The reduction in five intersection tests is due to the physics engine not performing intersection tests with the five triangle objects (i.e., triangle objects 1605-1625) which are contained within the bounding volume which was not intersected by the velocity box (i.e., $BV_5$). In comparison a physics engine which does not traverse the velocity box through an integrated acceleration data structure, rather merely performs intersection tests with the velocity box and every other object within the three-dimensional scene will execute intersection tests with the velocity box and the triangle objects (i.e., triangle objects 1605-1625).

Although, in the present example, the reduction in calculations is relatively small, in a three-dimensional scene containing many objects, casting a velocity box into the scene and traversing the velocity box through the integrated acceleration data structure to determine which objects may be used in collision tests may result in a substantial reduction in calculations. Consequently, the processing time required to perform physics simulation may be substantially reduced.

In addition to reducing the number of objects which may need to be tested against to determine if the moving object collides with other objects, box casting may be used to parallelize physics calculations in a multi-processor environment. For example, a physics engine may use box casting to parallelize collision detection in the multiple-core processing element 100 or in the network of multiple-core processing elements 200.

According to one embodiment of the invention, a physics engine may parallelize collision detection by box casting to determine which objects a moving object is likely to collide, and then using separate processing elements to determine if the moving object collides with any of the objects which are likely to collide with the moving object. The separate processing elements may perform intersection tests and collision detection tests to determine if the moving object collides with any of the objects which are likely to collide with the moving object.

For example, a physics engine may use box casting to determine that two objects are likely to intersect a moving object. The physics engine may then use a thread of a first processing element (e.g., a BTE 105) to execute intersection tests and collision tests to determine if the moving object collides with a first of the two objects, and a thread of a second processing element (e.g., a BTE 105) to execute intersection tests and collision tests to determine if the moving object collides with a second of the two objects. Thus, the physics engine may parallelize collision detection by using box casting and two separate processing elements.

CONCLUSION

By casting a velocity box into a three-dimensional scene and traversing the velocity box through an integrated acceleration data structure, a physics engine may determine which objects are in the same area of the three-dimensional scene, and are likely intersect the velocity box. The results of traversing the velocity box through the integrated acceleration data structure may be objects which are in the same bounding volumes and thus the same area as the velocity box. The physics engine may use the objects in the same area when performing intersection tests. By only using objects which are in the same area as the velocity box during intersection tests, the physics engine may reduce the number of intersection tests which are necessary to determine which objects intersect the velocity box. A reduction in the number of intersection tests which may need to be performed by the physics engine may reduce the amount of time necessary to determine if a moving object collides with any other objects within the scene.

While the foregoing is directed to embodiments of the present invention, other and further embodiments of the invention may be devised without departing from the basic scope thereof, and the scope thereof is determined by the claims that follow.

What is claimed is:

1. A method of performing collision detection in physics simulation, comprising:
generating a velocity box that encompasses a path traversed by a first moving object over an entire predetermined period of time in a three-dimensional scene, wherein dimensions of the velocity box are determined based on at least a size of the first moving object and the path traversed by the first moving object over the entire predetermined period of time, and wherein the velocity box does not encompass a path traversed by a second moving object over the entire predetermined period of time in the three-dimensional scene;
casting the velocity box into the three-dimensional scene to determine a set of objects in a same area as the velocity box in the three-dimensional scene; and
based on the set of objects in the same area of the velocity box and by operation of one or more computer processors, determining objects which collide with the first moving object during the predetermined period of time.

2. The method of claim 1, wherein casting the velocity box into the three-dimensional scene comprises:
tracing the velocity box through an integrated acceleration data structure having nodes defining bounding volumes within the three-dimensional scene and having branches from nodes defining bounding volumes to nodes defining objects within bounding volumes; and
creating the set of objects in the same area of the velocity box based on the object nodes branched to from bounding volumes intersected by the velocity box.

3. The method of claim 2, wherein tracing the velocity box through an integrated acceleration structure comprises:
taking branches to nodes defining bounding volumes intersected by the velocity box until a node defining an object within the bounding volumes intersected by the velocity box is reached.

4. The method of claim 1, wherein determining objects which collide with the first moving object comprises:
performing intersections tests with the velocity box and objects within the set of objects in the same area as the velocity box to create a set of objects which intersect the velocity box; and
performing collision detection tests with the set of objects which intersect the velocity box and the first moving object to determine which objects in the set of objects which intersect the velocity box collide with the first moving object.

5. The method of claim 1, wherein the integrated acceleration data structure comprises nodes corresponding to axis aligned bounding volumes.

6. The method of claim 5, wherein sides of the velocity box are aligned with axes used to create the integrated acceleration data structure.

7. A non-transitory computer readable medium containing a program which, when executed, performs operations comprising:
generating a velocity box that encompasses a path traversed by a first moving object over an entire predetermined period of time in a three-dimensional scene, wherein dimensions of the velocity box are determined based on at least a size of the first moving object and the path traversed by the first moving object over the entire predetermined period of time, and wherein the velocity box does not encompass a path traversed by a second moving object over the entire predetermined period of time in the three-dimensional scene;
casting the velocity box into the three-dimensional scene to determine a set of objects in a same area as the velocity box in the three-dimensional scene; and
based on the set of objects in the same area of the velocity box, determining objects which collide with the first moving object during the predetermined period of time.

8. The non-transitory computer readable medium of claim 7 wherein casting the velocity box into the three-dimensional scene comprises:
    tracing the velocity box through an integrated acceleration data structure having nodes defining bounding volumes within the three-dimensional scene and having branches from nodes defining bounding volumes to nodes defining objects within bounding volumes; and
    creating the set of objects in the same area of the velocity box based on the object nodes branched to from bounding volumes intersected by the velocity box.

9. The non-transitory computer readable medium of claim 8 wherein tracing the velocity box through an integrated acceleration structure comprises:
    taking branches to nodes defining bounding volumes intersected by the velocity box until a node defining an object within the bounding volumes intersected by the velocity box is reached.

10. The non-transitory computer readable medium of claim 7, wherein determining objects which collide with the moving object comprises:
    performing intersections tests with the velocity box and objects within the set of objects in the same area as the velocity box to create a set of objects which intersect the velocity box; and
    performing collision detection tests with the set of objects which intersect the velocity box and the first moving object to determine which objects in the set of objects which intersect the velocity box collide with the first moving object.

11. The non-transitory computer readable medium of claim 7, wherein the integrated acceleration data structure comprises nodes corresponding to axis aligned bounding volumes.

12. The non-transitory computer readable medium of claim 11, wherein sides of the velocity box are aligned with axes used to create the integrated acceleration data structure.

13. A system for performing collision detection in physics simulation, comprising:
    a memory device; and
    a processing element configured to: generate a velocity box that encompasses a path traversed by a first moving object over an entire predetermined period of time in a three-dimensional scene, wherein dimensions of the velocity box are determined based on at least a size of the first moving object and the path traversed by the first moving object over the entire predetermined period of time, and wherein the velocity box does not encompass a path traversed by a second moving object over the entire predetermined period of time in the three-dimensional scene; and cast the velocity box into the three-dimensional scene to determine a set of objects in a same area as the velocity box of the first moving object in the three-dimensional scene.

14. The system of claim 13, further comprising:
    a second processing element configured to determine if one or more objects collide with the first moving object by performing intersection tests with the velocity box and a first portion of the set of objects in the same area as the velocity box to determine a first set of objects which intersect the velocity box, and perform collision detection tests with the first set of objects which intersect the velocity box and the moving object to determine if one or more objects in the first set of objects collide with the moving object; and
    a third processing element configured to determine if one or more objects collide with the first moving object by performing intersection tests with the velocity box and a second portion of the set of objects in the same area as the velocity box to determine a second set of objects which intersect the velocity box, and perform collision detection tests with the second set of objects which intersect the velocity box and the first moving object to determine if one or more objects in the second set of objects collide with the first moving object.

15. The system of claim 13 wherein the processing element casts the velocity box into the three-dimensional scene by:
    tracing the velocity box through an integrated acceleration data structure having nodes defining bounding volumes within the three-dimensional scene and having branches from nodes defining bounding volumes to nodes defining objects within bounding volumes; and
    creating the set of objects in the same area of the velocity box based on the object nodes branched to from bounding volumes intersected by the velocity box.

16. The system of claim 15, wherein the processing element traces the velocity box through an integrated acceleration structure by:
    taking branches to nodes defining bounding volumes intersected by the velocity box until a node defining an object within the bounding volumes intersected by the velocity box is reached.

17. The system of claim 13, wherein the processing element is further configured to:
    determine if the first moving object collides with one or more objects in the same area as the velocity box;
    determine a new position of the first moving object if the first moving object collides with one or more objects in the set of objects in the same area as the velocity box, and store the new position of the first moving object in the memory device.

18. The system of claim 17, further comprising:
    a second processing element configured to render a two-dimensional image from the three-dimensional scene using at least the new position of the first moving object.

19. The method of claim 1, wherein the three-dimensional scene is divided into a hierarchy of bounding volumes, wherein the hierarchy of bounding volumes is represented by an integrated acceleration data structure having a hierarchy of nodes, each node representing at least one of: (i) a respective bounding volume of the hierarchy of bounding volumes and (ii) an object in the three-dimensional scene;
    wherein casting the velocity box into the three-dimensional scene to determine the set of objects in the same area as the velocity box in the three-dimensional scene comprises:
        tracing the velocity box through the integrated acceleration data structure to determine one or more bounding volumes that are not subdivided into any further bounding volumes and that intersect the velocity box; and
        for each bounding volume of the determined one or more bounding volumes, selecting each object branched to from the respective bounding volume, for inclusion in the set of objects in the same area of the velocity box.

20. The method of claim 1, wherein the predetermined period of time specifies a period of time between a first frame and a subsequent frame, wherein the three-dimensional scene includes an object that is not in the same area as the velocity box, and wherein determining objects which collide with the first moving object comprises:
    performing one or more intersection tests between the velocity box and the set of objects in the same area as the velocity box to create a set of objects which intersect the velocity box, wherein no intersection test is performed between the velocity box and the object that is not in the same area as the velocity box, and wherein at least one object in the set of objects in the same area as the velocity box does not intersect with the velocity box; and performing one or more collision detection tests between the first moving object and the set of objects which intersect the velocity box, wherein no collision detection test is performed between the first moving object and the object that is not in the same area as the velocity box, and wherein no collision detection test is performed between the first moving object and the at least one object that does not intersect with the velocity box.

* * * * *